(12) United States Patent
Schulz-Hanke et al.

(10) Patent No.: US 7,484,881 B2
(45) Date of Patent: Feb. 3, 2009

(54) STATIC MIXER

(75) Inventors: Wolfgang Schulz-Hanke, Untermeitingen (DE); Petra Jakobstroeer, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 349 days.

(21) Appl. No.: 11/063,958

(22) Filed: Feb. 23, 2005

(65) Prior Publication Data

US 2005/0185508 A1 Aug. 25, 2005

(30) Foreign Application Priority Data

Feb. 23, 2004 (DE) .................. 10 2004 008 755

(51) Int. Cl.
*B01F 5/06* (2006.01)
(52) U.S. Cl. .................... 366/339; 422/275
(58) Field of Classification Search ............ 366/181.5, 366/336–341; 422/215, 275
See application file for complete search history.

(56) References Cited

U.S. PATENT DOCUMENTS

| | | | |
|---|---|---|---|
| 302,675 A * | 7/1884 | Suits ..................... | 422/275 |
| 1,626,487 A * | 4/1927 | Warren .................. | 366/163.2 |
| 1,857,348 A * | 5/1932 | Bokenkroger .......... | 55/446 |
| 2,006,085 A * | 6/1935 | Lehmkuhl .............. | 134/93 |
| 2,600,733 A * | 6/1952 | Clift ..................... | 366/142 |
| 3,018,841 A * | 1/1962 | Gerlich .................. | 181/258 |
| 3,286,992 A * | 11/1966 | Armeniades et al. ..... | 366/339 |
| 4,204,775 A * | 5/1980 | Speer .................... | 366/336 |
| 4,293,425 A | 10/1981 | Price | |
| 5,904,851 A | 5/1999 | Taylor | |
| RE36,235 E | 6/1999 | Keller | |
| 6,364,218 B1 | 4/2002 | Tudor | |

FOREIGN PATENT DOCUMENTS

| | | |
|---|---|---|
| DE | 3609556 | 10/1987 |
| DE | 4412261 | 10/1996 |
| WO | 9903571 | 1/1999 |

\* cited by examiner

*Primary Examiner*—David L Sorkin
(74) *Attorney, Agent, or Firm*—Abrlman, Frayne & Schwab

(57) ABSTRACT

A static mixer for mixing components of liquid reactive multicomponent compounds includes a jacket (1) having a mixing section (4). The static mixer also includes an inlet (2), an outlet (3), at least one mixing element (5) arranged in the mixing section (4) and having its outer dimensions adapted to inner dimensions of the jacket (1), and at least one chamber (6) arranged between the inlet (2) and the outlet (3) for receiving additives (7) which are added to a mixture produced in the static mixer.

19 Claims, 4 Drawing Sheets

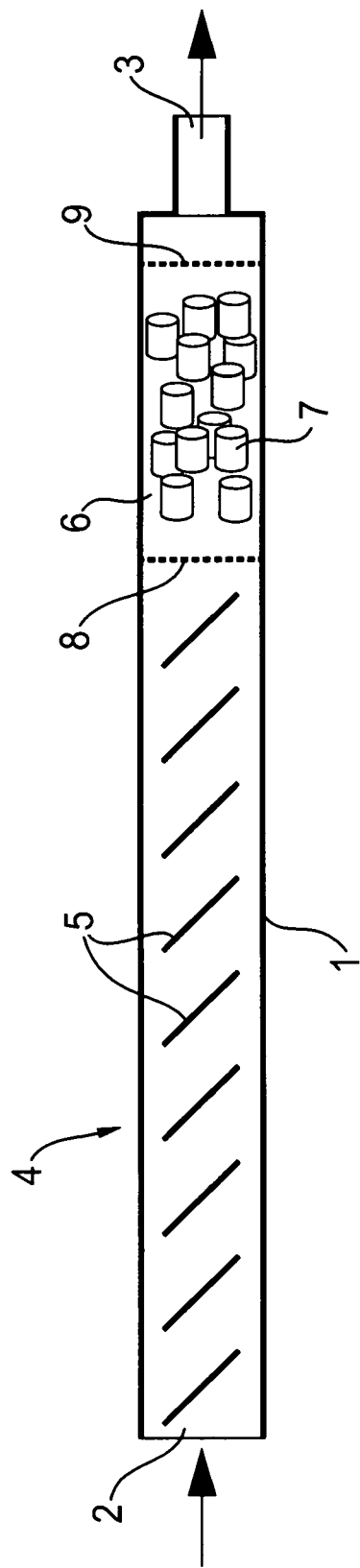

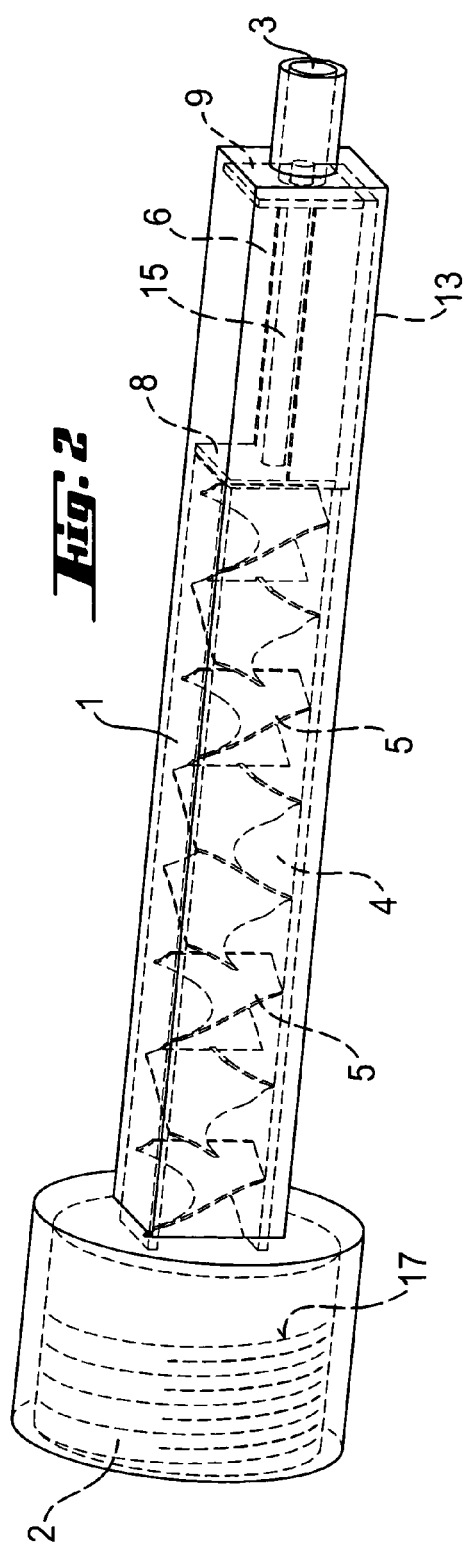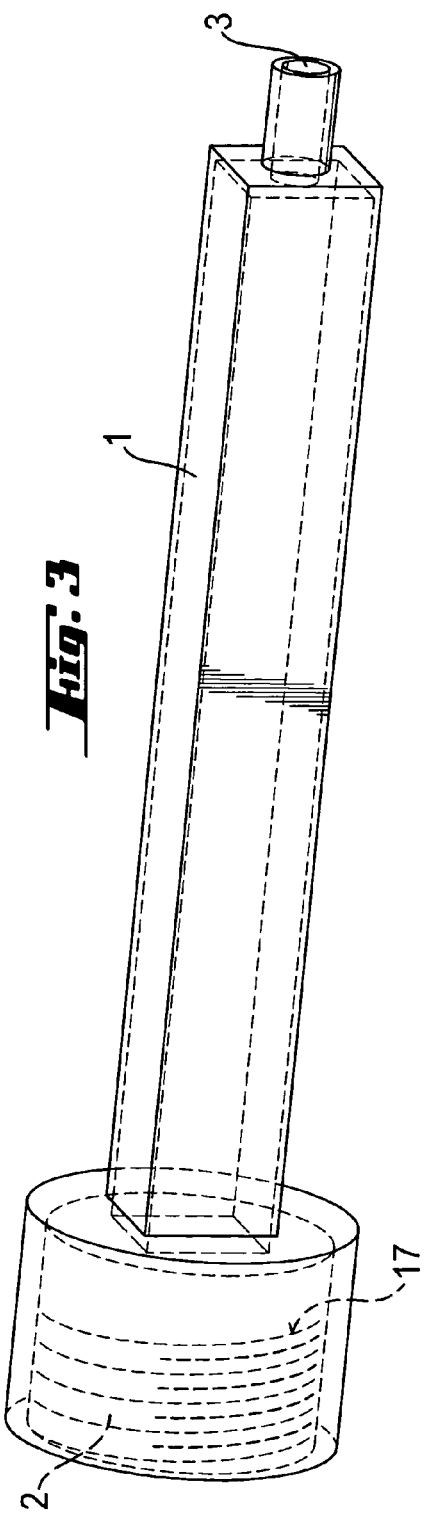

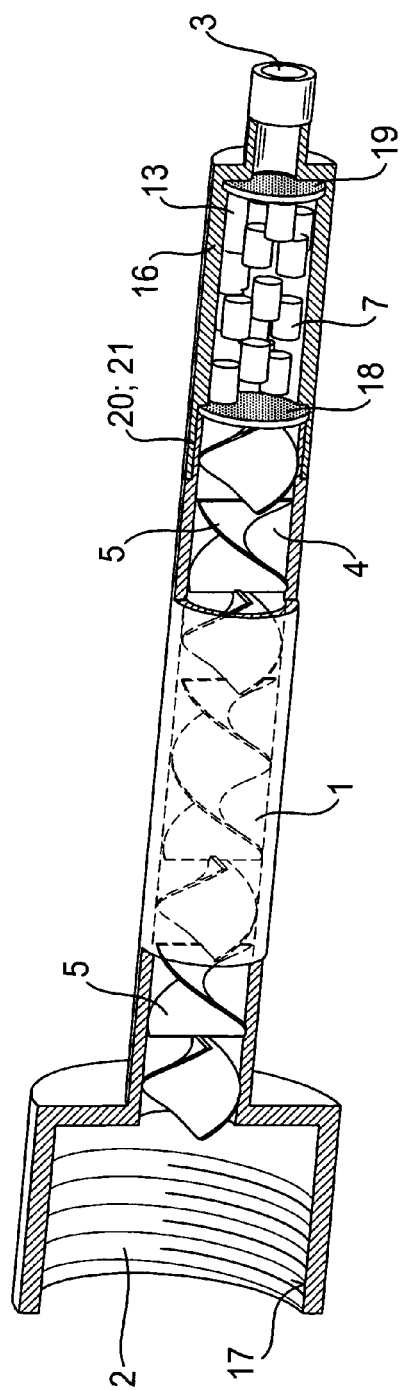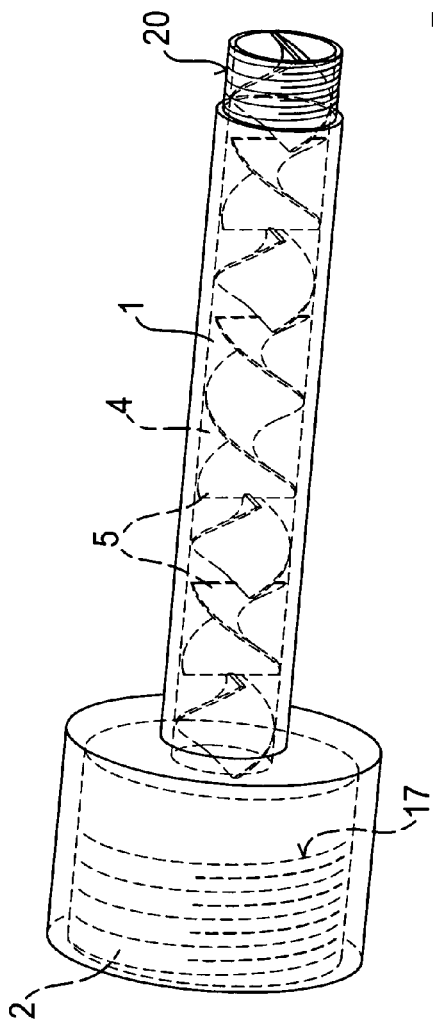

STATIC MIXER

BACKGROUND OF THE INVENTION

1. Field of the Invention

The present invention relates to a static mixer for mixing components of liquid reactive multicomponent compounds and including a jacket having a mixing section, an inlet and an outlet, and at least one mixing element arranged in the mixing section and having its outer dimensions adapted to inner dimensions of the jacket. The present invention also relates to the use of the static mixer for introducing additives that influence physical and/or chemical characteristics of a liquid mixture produced of liquid reactive components forming a multicomponent compound.

2. Description of the Prior Art

Liquid reactive multicomponent compounds are used in diverse ways as, e.g., two-component glues, two-component mortar masses for securing structural components, anchor rods and the like in solid constructional grounds such as brickwork, concrete or similar hard bases, or for forming fire-protection foams or constructional foams used for filling of breakthroughs, leadthroughs, and openings in walls, ceilings, and floors of buildings or for forming of windows or doors of buildings. Such multicomponents compounds, in particular, those used on a building site, are usually available in multi-chamber containers or vessels in which components that react with each other, are stored separate from each other, without a possibility of a reaction therebetween. During use, the different components are fed from the separate containers, e.g., by being squeezed-out with an ejector device, and are mixed with each other. Thereafter, the mixture is introduced into the use region, e.g., a dowel bore.

Finally, the fastening components are introduced, e.g., an anchor rod is inserted in the dowel bore filled with the mixture. Then, hardening of the compound, which is obtained by intermixing of the components, takes place.

In a region, which is thermally insulated from buildings, metering apparatuses are used for spraying onto walls and roofs large-surface insulating foam sheets. To this end, there is provided, in the front region of a spray gun, caps with which separate components of multicomponent insulating foamed compounds are mixed with each other.

For mixing different components of compounds, usually static mixers are used in which there is arranged, in a jacket, a mixing element that provides for a homogeneous intermixing of components of a mixture by using the flow energy of the components of a multicomponent compound which are fed into the static mixer under pressure. Here, mixing devices are used that have either a movable container or a movable mixing tool and in which intermixing of the mixture takes place as a result of the effect of the movement energy of the mixture that continuously flows through the static mixer, with the mixing element or elements, which are located in the flow path, effecting an intensive intermixing of the mixture. As mixing elements, manifolds, expansion elements, injectors, counterflow conduits, swirling elements, guide plates, inserts of different types, which provide for an intensive intermixing due to their shape, are used.

Both the jacket and the mixing elements of such static mixers can be formed of different materials, e.g., metal, glass and, in particular, plastic materials. In particular, removable mixing elements of different shapes, which are used for intermixing and feeding of the multicomponent compounds in form of mortar mass, constructional foam, etc., are formed of a plastic material.

Mixers, which are used for intermixing of multicomponent compounds which are produced in form of mortar masses, constructional foams, fire protection foams, etc. at a constructional site before using them at a point of use, are generally available in form of disposable plastic static mixers having a jacket, mixing elements, which are arranged therein, with a static mixer being mountable on the outlet of an ejector tool. After a static mixer is fixed on the ejector apparatus or tool, the components of a multicomponent compound, which are stored in separate containers, are squeezed out under pressure either by mechanical means or using a pressure fluid or other drive means, from the separate containers, and are delivered through the mounted on the ejector apparatus, static mixer.

When such multicomponent compounds are used at a location of use, e.g., for filling openings, there is often exist a problem that consists in that the mixture, which is delivered out of the mouthpiece of the static mixer and in which hardening or foaming reactions take place, does not have yet a required viscosity after having been brought to the point of use, e.g., on the roof or transverse walls, and the mixture flows out of the openings and down the walls. Usually, in order to prevent the compound from flowing out, boards of cardboard which are secured to the underside of a roof or a wall with a scotch tape, are used. Also, in the region of openings or dry walls, boarding which is made of wire mesh or rib mesh and which is bent so that it is adapted to a respective opening, is used. Obviously, the use of boarding in order to prevent flow-out of a multicomponent compound is associated with additional operational steps and, accordingly, with increased costs.

It is further known to so modify a mortar mass and, in particular, foams, which are made of multicomponent compounds, with chemical or physical thixotrope means that the mortar mass or the foam reaches a satisfactory "stability" even when their interreaction has not been completed. By using such thixotrope means, unloaded, low-density insulation foams can be produced with a sufficient stability. With loaded, high-density fire protection foams, increase of the viscosity by using the thixotrope means creates certain problems during squeezing of the components out as a result of their increased flow resistance.

It has been found out that the stability of two-component polyurethane foams, which are used as constructional foams, can be increased by adding of acrylate to the mixture. The increase of the viscosity is obtained as a result of the physical effect on reactions of polyurethane formation of breaking or dispersion of the acrylate in the mixture because of difference in polarity between isocyanate and the first component. This results in delay and thereby to an increase of the viscosity of the mixture.

The advantage of the breaking of the acrylate dispersion consists in that the mixture has, upon entering the mixer, a smaller viscosity which is increased slowly as the mixture passes through the mixer. As a result, a smaller force is required for squeezing the mixture out of the mixer. When the foam leaves the static mixer, it has a sufficiently high adhesiveness for adhering to a wall, and a viscosity that prevent the flow of the mixture out of openings or down a wall.

The drawback of the above-discussed effect of breaking of the acrylate dispersion in a two-component-polyurethane-acrylate foam compound consists in that the polyurethane reaction depends in a large degree on a temperature. At high temperatures during the use of a compound, above 25° C., which usually exist in summer on a constructional site, there is a danger of the polyurethane formation reaction running more rapidly than breaking of the acrylate dispersion, with resulting increase in viscosity. This would not permit to achieve a desired effect of preventing the mixture from flowing out. As a result, the desired physical breaking of the dispersion becomes suppressed, and desired physical characteristics of the hardened foam are not achieved, e.g., because of a smaller density of the hardened material. It is also possible to vary the speed of the dispersion breaking by adding suitable additives to polyol components and to polyisocyanate components and mixtures produced in a static mixer. Generally, the increase of the speed of breaking of the dispersion is limited by a physical length of the mixer. When the speed of breaking of dispersion is too high, the dispersion in the static mixer fails completely, which result in that high forces need to be applied to deliver the mixture from the static mixer.

An object of the present invention is to provide a static mixer which would insure delivery of a liquid mixture formed of a liquid reactive multicomponent compound and physical and/or chemical characteristics of which can be purposely influenced in such a way that the required or desired characteristics are only achieved after the mixture leaves the mixer so that a small force is required for squeezing the mixture out of the mixer.

Another object of the present invention is a static mixer that would provide for rapid influence of the additives on physical and/or chemical characteristics of the mixture by insuring a good intermixing of the additives with the mixture, so that the mixture would have the desired physical and/or chemical characteristics immediately after being delivered from the outlet of the static mixer. This should insure that the produced, e.g., constructional foam has a high adhesive property, which would insure its good adherence at the predetermined point of use, and a required high stability, which would provide for a boarding-free placing of a foam on a wall and a roof.

A further object of the present invention is to provide a mixer with which it would be possible to select appropriate filler materials and to add them in a necessary amount to the mixture, before its use at a predetermined point of use, dependent on the expected environment conditions or on the required characteristics of the mixture.

SUMMARY OF THE INVENTION

These and other objects of the present invention, which will become apparent hereinafter, are achieved by providing, in the jacket, of a chamber located, preferably in the vicinity of the outlet and into which the additives, which are to be added to the mixture, are brought, preferably, in a solid state.

With such a chamber, the mixture, which flows through the static mixer and is intermixed therein, flows past the additives, intermixing therewith. This permits to achieve a good intermixing of the mixture with the additives immediately before the outlet of the static mixer, which insure obtaining of the desired characteristics of a mixture that exits the static mixer.

According to the invention, there is provided a static mixer for mixing components of liquid reactive multicomponent compounds and including a jacket having a mixing section, with the static mixer further including an inlet, an outlet, at least one mixing element arranged in the mixing section and having its outer dimension adapted to inner dimensions of the jacket, and at least one chamber arranged between the inlet and the outlet for receiving additives which are added to a mixture produced in the mixer.

As additives, per se known products, which increase the viscosity of a mixture that flows through a static mixer and which cause gel formation, are used., As such dispersion-breaking means, salts or pH-value-increasing materials, which relatively easy dissolve or disperse in a mixture, are used. As additives, polymerization accelerators, thixotrope means, filling means, liquefying means, and the like can be used. Further, it is possible to use as additives of the type discussed above, catalysts for the reactions that take place in the mixture.

The scope of the change of physical and/or chemical characteristics or of reaction conditions of the reactive mixture is controlled by selection of type, amount, and particle size of, preferably, solid additives to-be-fed into the chamber and which dissolve or disperse as the mixture flows thereby. The non-dissolved or non-dispersed additives are retained in the chamber.

Because with the inventive static mixer, it is possible to locate the additive at any location of a static mixer, it is possible to so control the desired change of the physical and/or chemical characteristic of the mixture that the mixture has the desired characteristics immediately after leaving the static mixer.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS:

The drawings show:

FIG. 1 a schematic view of a static mixer according to the present invention;

FIG. 2 a perspective view of a first embodiment of a static mixer according to the present invention in an assembled condition, with the mixing elements located in the jacket and chamber components shown with dash lines;

FIG. 3 a perspective view of the jacket of the static mixer shown in FIG. 2;

FIG. 7 a perspective view of a second embodiment of a static mixer according to the present invention in an assembled condition, with the mixing elements located in the jacket and with a chamber formed as a tubular section;

FIG. 8 a perspective partial view of the static mixer shown in

FIG. 7 without the chamber for receiving additives which are added to the mixture; and FIG. 9 a perspective view of the removable chamber for receiving additives.

DETAILED DESCRIPTION OF THE PREFERRED EMBODIMENTS

Figure 4:
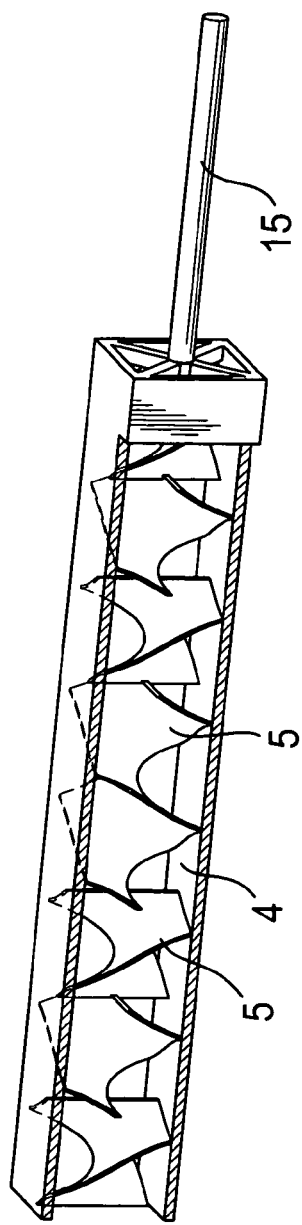
FIG. 4 a perspective view of the mixing elements of the static mixer shown in FIG. 2.

A static mixer according to the present invention, which is shown in FIG. 1, has a jacket 1, an inlet opening 2 through which the components of a multicomponent compounds are introduced into the static mixer for being mixed there, and an outlet opening 3 for delivery of the mixture. In the jacket 1, there is provided at least one mixing section 4 with a plurality of mixing elements 5 the outer dimensions of which correspond to the inner dimensions of the jacket 1. Between the inlet 2 and the outlet 3, there is provided in the jacket 1 at least one chamber 6 in which additives which are added to the mixture, are contained.

The chamber 6 is generally arranged in front of or after the mixing section 4 or, in case the mixer has several mixing sections, between two adjacent mixing sections.

The jacket 1 can have a circular, oval and/or angular, preferably, circular and/or square inner cross-section. The outer cross-section can be arbitrary selected. Further, the jacket 1 can have a continuous cylindrical inner space, i.e., the cross-section of the inner space in all regions is the same. On the other hand, the cross-sections of the jacket 1 can increase or decrease from the inlet to the outlet. Preferably, the cross-sections of the inner space regions decrease from the inlet to the outlet, i.e., the jacket 1 narrows from the inlet 2 to the outlet 3.

According to an advantageous embodiment of the present invention, the at least one chamber 6 for receiving additives 7 added to the mixture has, at its inlet and and/or its outlet end, boundary element(s) 8 and 9. The boundary element or elements should be permeable for the mixture but should hold the not yet dissolved or dispersed in the mixture additives 7. According to a preferred embodiment of the present invention, the at least one chamber 6 is limited by two boundary elements 8, 9 provided at its opposite ends. The boundary elements 8, 9 can be formed as sieves, aperture plates, sintering plates, and/or be formed of a fleece or filter material, e.g., as a filter bag. Generally, the boundary elements can be formed of any material, e.g., paper, metal, glass, and/or plastics.

A first embodiment of the static mixer according to the present invention, which is shown in FIGS. 2-6, has a square jacket 1 with a square inner and outer cross-section. The jacket 1 has an inlet 2 and an outlet 3. The inlet 2 is provided with plug-in, thread, clamp, and/or bayonet connection means, preferably, thread means for releasably connecting the jacket 1 with an outlet of an ejector apparatus (not shown) in which components of a liquid, reactive multicomponent compound are contained in separate containers. The plug-in, thread, clamp, and/or bayonet connection means, or the thread means 17 can be provided with a suitable seal that would prevent leakage of the mixture in the connection joint.

FIG. 2 shows the mixing element 5 which is arranged in the jacket 1. The mixing element 5 is shown with dash lines. Also shown in FIG. 2, a container 13 for receiving the additive 7 added to the mixture. The container 13 in located in the chamber 6 both of which are also shown with dash lines.

FIG. 3 shows separately the jacket 1 of the static mixer with the inlet 2, outlet 3, and the thread connection means 17.

Figure 5:
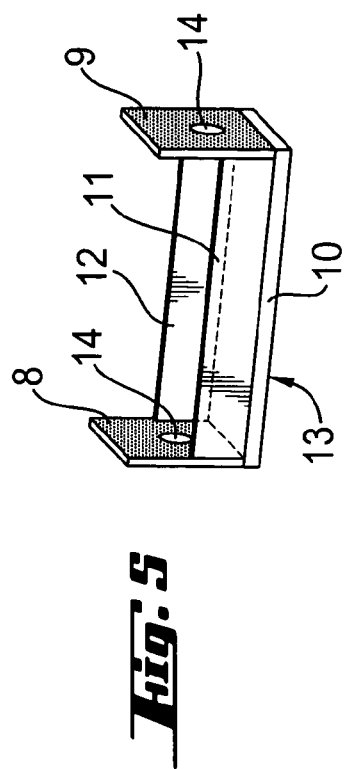
FIG. 5 a perspective view of a container for receiving additives to be added to the mixture and which is inserted into the mixer chamber.

FIG. 4 shows the mixing element 5. The mixing element 5 has a shape similar to that of a known mixing element for a conventional Kenics-mixer. The mixing element 5 has a center mandrel 15 at one of its end for centering the container 13 for the additive 7 and which is shown in FIG. 5. The container 13 is formed by the boundary elements 8 and 9 that are permeable for the mixture but are capable to retain the not yet dissolved or dispersed additive 7. According to the preferred embodiment, which is shown in FIGS. 2-6, the boundary elements 8, 9 are secured on an elongate support 10 the dimensions of which corresponds to the dimensions of the chamber 6. The support 10 has side cheeks 11, 12, forming the upwardly opening, container 13 for receiving the additive 7. In this embodiment, the boundary elements 8, 9 have each a respective opening 14 for attaching the containers 13 to the mixing element 5 by pushing the container 13 over the center mandrel 15 of the mixing element 5. The inner diameter of the openings 14 is so adapted to the outer diameter of the center mandrel 15 that leakage of the mixture between the inner edges of the openings 14 and the circumference of the center mandrel 15 is prevented to a most possible extent.

Figure 6:
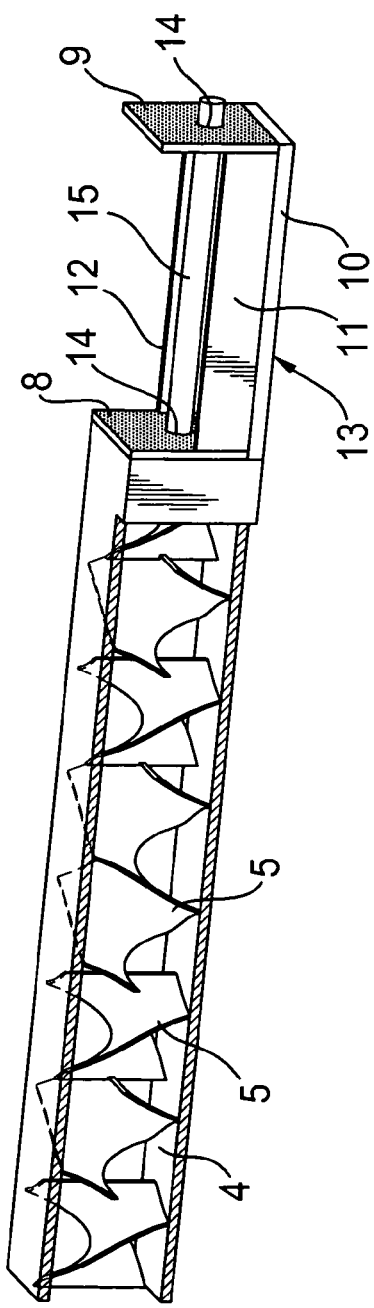
FIG. 6 a perspective view of the combination of the mixing elements and the container for receiving additives.

For a predetermined use of the static mixer, the container 13, which is shown in FIG. 5, is filled with the additive 7, which is added to the mixture, and is pushed over the center mandrel 15, forming a unit mixing element 5-container 13 which is shown in FIG. 6 and which is inserted into the jacket 1 shown in FIG. 3. The mixer, which is formed of the jacket 1 with the unit mixing element 5-container 13, is screwed with the thread connection means 17 onto an ejector apparatus containing separate containers in which the components of the liquid, reactive multicomponent compound are stored. The jacket 1 is so secured to the ejector apparatus that the leakage at the connection joint is prevented.

A second embodiment of the static mixer according to the present invention, which is shown in FIGS. 7-9, has a cylindrical jacket having a circular cross-section and provided with an inlet 2 with thread connection means 17 for securing the mixer to an ejector apparatus, as discussed above. In the mixing section 4 of the jacket 1, there is arranged the mixing element 5 shown with dash lines. In this embodiment, the chamber 6 is formed as a tubular section 16 releasably connectable with the jacket 1. The outlet opening 3 is provided, in this embodiment, in the tubular section 16. As shown in FIG. 7, the additives 7 are located in the tubular section 16.

Preferably, the inner cross-section and the surface profile of the tubular section 16 corresponds to the circular, oval, and/or angular, preferably circular and/or squared inner cross-section and surface profile of the jacket 1. In the embodiment shown in FIGS. 7-9, the tubular section 16 is formed as a cylindrical section with a circular cross-section that corresponds to the circular cross-section of the jacket 1.

According to a particularly advantageous embodiment of the static mixer shown in FIGS. 7-9, the outlet 3 is fixedly secured on the tubular section 16 which is releasably securable to the jacket 1. In particular, the tubular section 16 is provided with a thread 21 that cooperates with a thread 20 provided on the jacket 1 for releasably securing the tubular section 16 to the jacket 1. Even more advantageously, the tubular section 16 and the outlet 3 are formed as a one-piece member, preferably, of a plastic material and that is produced by injection molding. The one-piece member is connected with the jacket 1 by the thread 21.

Advantageously, between the tubular section 16 and the jacket 1 and/or in front of the outlet 3, there are provided removable boundary elements 18, 19 in form of sieves, aperture plates, and/or sinter plates which are formed of paper, metal, plastics, and/or glass or of fleece or filter material, e.g., in form of a filter bag.

According to further development of these embodiments which are shown, respectively, in FIGS. 2-6 and 7-9, at least the mixing element 5, the container 13, the boundary elements 8, 9 and 18, 19 are secured against rotation and displacement in a forward direction, e.g., by appropriately shaping the inner cross-section of the jacket 1 and the outer cross-section of the mixing element 5, boundary elements 8, 9 and 18, 19 and the container 13, e.g., by forming grooves in the inner surface of the jacket 1 and noses on the mixing element 5, the boundary elements 8, 9 and 18, 19, and/or the container 13.

According to the invention, the boundary elements 8, 9 and 18, 19 have openings dimensioned so that the mixture can pass through these openings, but additives, which has not yet dissolved or dispersed in the mixture, are retained. Preferably, these openings have a shape of holes, sieve openings, sinter openings, pores, and the like, and a diameter from 0.2 mm to 2 mm, preferably, 1 to 1.5 mm.

According to the present invention, at least one mixing element 5 is arranged in the jacket 1, or in the chamber 6, or the tubular section 16 and which carries, on at least one of its outer surfaces, additives 7 that are added to the mixture, or which is formed of the additives. E.g., it is possible to form the mixing element of a material that acts as a catalyst or is coated with such a material which catalyses and accelerates the reaction of the mixture produced of liquid, reactive components of a multicomponent compound. In this way, it is insured that the mixture has a sufficiently low viscosity necessary for its transportation already as it passes through the static mixer, while having, upon exiting the outlet 3, a viscosity that prevents run off of the material after raising of covers or walls.

Preferably, the mixing element is so formed that the mixing of the components of the mixture is effected as a result of the use of the flow energy of the components of the liquid, reactive multicomponent compound which are fed in the static mixer under pressure.

Advantageously, the mixing element or elements 5 are secured in the jacket 1 against rotation, e.g.,, by forming grooves in the inner wall of the jacket 1 and corresponding noses on the mixing element(s) 5.

The outer dimensions of the mixing elements 5 and of the boundary elements 8, 9, 18, 19 are so adapted to the inner dimensions of the jacket 1 or the tubular piece 16 that blow by of the mixture between the inner wall of the jacket 1 and the outer circumference of the mixing element(s) 5 and the boundary elements 8, 9, 18, 19 is prevented. In this way, it is insured that the mixture always passes through the static mix a good contact with the additives that are added to the mixture.

For a releasable connection of the tubular section 16 with the jacket 1, instead of a threaded connection shown in FIGS. 7-9, plug-in connection, clamp connection and/or bayonet connection can be used. Advantageously, a suitable seal is provided in the connection location in order to prevent the leakage of mixture at the connection joining.

According to the present invention, the jacket 1, the tubular section 16, the mixing elements 5, components of the container 13, and the boundary elements 8, 9, 18, 19 can be formed of glass, plastic material, and/or metal.

As it has already been discussed above, the jacket 1 of the inventive static mixer can have, instead of thread means 17 or 21, plug-in, clamping, screw, and/or bayonet connection means that likewise prevents leakage of the mixture. However, preferably, the thread connection means is used for connecting the jacket with an ejector apparatus with separate containers in which the components of the liquid, reactive multicomponent compound are stored. The connection takes place after the additives 7 are placed in the chamber 6. The type and amount of the additives is selected dependent on the reactions that take place between the mixture components and/or dependent on the required characteristics of the mixture that is produced in the mixture that is produced in the mixture and that is delivered through the outlet 3 of the static mixture.

A further subject matter of the invention is the use of the above-described static mixer for feeding additives into a mixture Which modify physical and/or chemical characteristics of the mixture. E.g., the additives are used for increasing the viscosity of the mixture. Most advantageously, the inventive static mixture is used for increasing the viscosity of not yet reacted, liquid fire protection foam that is produced in the mixing section 4.

Further, the static mixer according to the present invention can be used for increasing the speed of a polyurethane formation or of a foaming process of producing a polyurethane foamed system by introducing into the mixture additives that provide for homogeneous intermixing of liquid, reactive multicomponent compounds of which the liquid polyurethane foamed system is formed.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A static mixer for mixing components of liquid reactive multicomponent compounds, comprising:
   an outlet (3);
   a jacket (1) having:
      a mixing section (4); and
      an inlet (2);
   at least one mixing element (5) arranged in the mixing section (4) and having outer dimensions thereof adapted to inner dimensions of the jacket (1);
   a tubular section (16) releasably connectable to and removable from the jacket (1), with the tubular section (16) including at least one chamber arranged between the inlet (2) and the outlet (3) when the tubular section (16) is connected to the jacket (1), with the at least one chamber for receiving additives (7) which are added to a mixture produced in the static mixer; and
   a pair of boundary elements (18, 19), with the boundary element (18) positioned in the tubular section (16) and arranged between the tubular section (16) and the jacket (1) when the tubular section (16) is connected to the jacket (1), and with the boundary element (19) positioned substantially adjacent to the outlet (3).

2. A static mixer according to claim 1, wherein the at least one additives-receiving chamber is located, in a direction of flow of the mixture, downstream from the mixing section (4).

3. A static mixer according to claim 1, wherein the jacket (1) has a surface profile with a circular cross-section.

4. A static mixer according to claim 3, wherein the jacket (1) has an inner space with a circular cross-section.

5. A static mixer according to claim 1, wherein the jacket (1) has at least one of circular, oval, and angular inner cross-sections, and wherein the tubular section (16) has an inner cross-section and a cross-sectional profile adapted,respectively to the inner cross-section and a cross-sectional profile of the jacket (1).

6. A static mixer according to claim 5, wherein the jacket (1) has at least one of circular and square inner cross-section, and the tubular section (16) has a corresponding inner cross-section.

7. A static mixer according to claim 1, wherein the tubular section (16) is releasably connectable with the jacket (1) and is fixedly connected with the outlet (3).

8. A static mixer according to claim 7, wherein the tubular section (16) and the outlet (3) are formed as one-piece member.

9. A static mixer according to claim 1, wherein the boundary elements (18, 19) are formed as at least one of sieve, aperture plate, sinter plate, a fleece material filter, and a filter bag.

10. A static mixer according to claim 1, comprising means for securing the boundary elements (18, 19) against displacement in a forward direction.

11. A static mixer according to claim 1, wherein openings in the boundary elements (18,19) are permeable for the mixture but are not permeable for not yet dissolved or dispersed additives.

12. A static mixer according to claim 11, wherein the openings have a diameter from 0.2 mm to 2 mm.

13. A static mixer according to claim 12, wherein the openings have a diameter from 1 mm to 1.5 mm.

14. A static mixer according to claim 1, wherein at least one mixing element (5), which is one of carries the additives (7) to-be-added to the mixture on a surface thereof and consists of the additives (7), is arranged in the additives-receiving chamber.

15. A static mixer according to claim 1, wherein the at least on additives-receiving chamber is one of carries the additives (7) to-be-added to the mixture on an inner surface thereof and consists of the additives (7).

16. A static mixer according to claim 1, further comprising means for securing the mixing element (5) against rotation in the jacket (1).

17. A static mixer according to claim 1, further comprising thread means (20, 21) for releasably connecting the tubular section (16) with the jacket(1).

18. A static mixer according to claim 1, wherein the jacket (1), the mixing element (5), and the boundary element (18,19) is formed of at least one of glass, plastic material, and metal.

19. A static mixer according to claim 1, wherein the thread means (17) is provided at the inlet (2) of the jacket (1) for releasably connecting the static mixer to an outlet of an ejector apparatus containing components of a fluid reactive multicomponent compound to-be-produced in the mixer.

* * * * *